US008266057B2

(12) United States Patent
Carroll et al.

(10) Patent No.: US 8,266,057 B2
(45) Date of Patent: *Sep. 11, 2012

(54) METHODS AND SYSTEMS FOR ASSIGNING INTERCHANGE RATES TO FINANCIAL TRANSACTIONS USING AN INTERCHANGE NETWORK

(75) Inventors: Kevin P. Carroll, Brookfield, CT (US); Colin L. McGrath, New York, NY (US); Leland S. Englebardt, New York, NY (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,593

(22) Filed: Dec. 12, 2011

(65) Prior Publication Data

US 2012/0143749 A1    Jun. 7, 2012

Related U.S. Application Data

(63) Continuation of application No. 11/966,677, filed on Dec. 28, 2007, now Pat. No. 8,095,438.

(51) Int. Cl.
*G06Q 40/00* (2012.01)

(52) U.S. Cl. ........ 705/43; 705/14.1; 705/14.15; 705/40; 705/44

(58) Field of Classification Search .............. 705/14.1, 705/14.13, 14.15, 35, 40, 38, 39, 37, 42, 705/43, 44; 235/375, 380
See application file for complete search history.

(56) References Cited

U.S. PATENT DOCUMENTS

| | | | |
|---|---|---|---|
| 5,940,809 A | | 8/1999 | Musmanno et al. |
| 6,141,651 A | * | 10/2000 | Riley et al. ....................... 705/35 |
| 6,999,943 B1 | * | 2/2006 | Johnson et al. ................. 705/39 |
| 7,104,443 B1 | * | 9/2006 | Paul et al. ....................... 235/380 |
| 7,280,979 B1 | * | 10/2007 | Katz et al. ..................... 705/14.1 |
| 7,324,972 B1 | * | 1/2008 | Oliver et al. .................... 705/40 |
| 7,624,068 B1 | * | 11/2009 | Heasley et al. ................. 705/38 |
| 7,774,274 B2 | * | 8/2010 | Jones et al. ..................... 705/39 |
| 2002/0032656 A1 | * | 3/2002 | Chen .............................. 705/43 |
| 2004/0117300 A1 | * | 6/2004 | Jones et al. ..................... 705/39 |
| 2004/0215566 A1 | * | 10/2004 | Meurer ........................... 705/43 |
| 2004/0267673 A1 | * | 12/2004 | Ballard et al. .................. 705/77 |
| 2006/0020542 A1 | * | 1/2006 | Litle et al. ....................... 705/40 |
| 2006/0208065 A1 | * | 9/2006 | Mendelovich et al. ....... 235/380 |
| 2007/0136194 A1 | * | 6/2007 | Sloan .............................. 705/41 |
| 2007/0208671 A1 | * | 9/2007 | Brown et al. ................... 705/65 |

(Continued)

OTHER PUBLICATIONS

David Gosnell. (Aug. 2004). More Increases in PIN-Based Interchange. Credit Card Management, 17(5), 38-40. Retrieved Aug. 27, 2011, from ABI/INFORM Global.*

(Continued)

*Primary Examiner* — Matthew Gart
*Assistant Examiner* — Olusegun Goyea
(74) *Attorney, Agent, or Firm* — Armstrong Teasdale LLP

(57) ABSTRACT

A method for assigning an interchange rate to a financial transaction is provided. The method uses at least one input device in communication with an interchange database. The financial transaction is initiated by a cardholder using a card over a card interchange, the card having been issued by an issuer bank. The method includes the steps of storing issuer data within the interchange database, the issuer data including whether the issuer bank has entered into a special relationship with the interchange.

18 Claims, 5 Drawing Sheets

U.S. PATENT DOCUMENTS

| | | | | |
|---|---|---|---|---|
| 2007/0241183 A1* | 10/2007 | Brown et al. | | 235/380 |
| 2008/0010189 A1* | 1/2008 | Rosenberger | | 705/39 |
| 2008/0140579 A1* | 6/2008 | Sanjiv | | 705/76 |
| 2008/0201264 A1* | 8/2008 | Brown et al. | | 705/67 |
| 2009/0006262 A1* | 1/2009 | Brown et al. | | 705/64 |
| 2010/0070359 A1* | 3/2010 | Heasley et al. | | 705/14.17 |
| 2010/0235283 A1* | 9/2010 | Gerson | | 705/75 |
| 2010/0268615 A1* | 10/2010 | Rosenberger | | 705/17 |

OTHER PUBLICATIONS

Mitchell, Richard. (Oct. 1996). An inconvenient payment market. Credit Card Management, 9(7), 14. Retrieved Aug. 27, 2011, from ABI/INFORM Global.*

Mitchell, Richard. (Oct. 1996). An incovenient paymetn market. Credig Card Management, 9(7), 14. Retrieved Aug. 27, 2011, form ABI/INFORM Global.

* cited by examiner

METHODS AND SYSTEMS FOR ASSIGNING INTERCHANGE RATES TO FINANCIAL TRANSACTIONS USING AN INTERCHANGE NETWORK

CROSS REFERENCE TO RELATED APPLICATIONS

This application is a continuation application of application Ser. No. 11/966,677 filed on Dec. 28, 2007 now U.S. Pat. No. 8,095,438, which is hereby incorporated by reference in its entirety.

BACKGROUND OF THE INVENTION

This invention relates generally to assigning interchange rates to financial transactions and, more particularly, to methods and systems for assigning interchange rates to financial transactions instituted at a point of sale (POS) or an automated teller machine (ATM) and performed using an interchange network.

Historically, the use of "charge" or transaction cards for consumer transaction payments was at most regional and based on relationships between local credit or debit card issuing banks and various local merchants. The transaction card industry has since evolved with the issuing banks forming associations or networks (e.g., MasterCard®) and involving third party transaction processing companies (e.g., "Merchant Acquirers") to enable cardholders to widely use transaction cards at any merchant's establishment, regardless of the merchant's banking relationship with the card issuer. (MasterCard is a registered trademark of MasterCard International Incorporated located in Purchase, N.Y.).

For example, FIG. 1 of the present application shows an exemplary multi-party transaction card industry system for enabling transaction card transactions. Various scenarios exist in the transaction card industry today, where the card issuer has a special relationship with a network. The network may also be referred to as an "interchange". Consideration is now being given to ways of improving implementation of the special or customized issuer-network relationships in the transaction card industry. In particular, attention is being directed to utilizing legacy general purpose bankcard infrastructure to support the transaction routing, merchant accounting, and financial settlement for these special or individualized relationships.

As shown in FIG. 1, at least some known financial transactions involve a cardholder presenting a transaction card to a merchant at a point of sale for purchasing a good or service from the merchant, or presenting a transaction card to an ATM for obtaining cash. In either case, the financial transaction may involve transmitting data between an acquiring bank and an issuing bank. This data is typically transmitted through a bankcard network or interchange (e.g., Mastercard®). The interchange will in at least some cases charge at least one of the acquiring bank and the issuing bank for processing such data exchanges. It is difficult and time consuming for these parties to track these data exchanges and the charges associated therewith. Moreover, there is no known cost effective system for an interchange to track interchange rates that are associated with special relationships with the interchange, and therefore, may be charged a different amount than banks not having a special relationship.

BRIEF DESCRIPTION OF THE INVENTION

In one aspect, a method for assigning an interchange rate to a financial transaction is provided. The method uses at least one input device in communication with an interchange database. The financial transaction is initiated by a cardholder using a financial transaction card over an interchange, the card having been issued by an issuer bank. The method includes storing issuer data within the interchange database, wherein the issuer data includes whether the issuer bank has entered into a special relationship with the interchange. The method also includes receiving at the interchange transaction data from the input device, wherein the transaction data includes an identifier indicating whether the transaction is a point of sale (POS) transaction or an automated teller machine (ATM) transaction, and an identity of the issuer bank issuing the interrogated financial transaction card. The method further includes accessing the interchange database, matching the transaction data including the identity of the issuer bank with the issuer data stored within the interchange database, and automatically assigning an interchange rate to the transaction based on the received transaction data and the issuer data stored within the interchange database.

In another aspect, a network-based system for assigning an interchange rate to a financial transaction is provided. The financial transaction is initiated by a cardholder using a financial transaction card over a card network wherein the card is issued by an issuer bank. The system includes an input device, an interchange database for storing information; and a server system configured to be coupled to the input device and the interchange database. The server is further configured to store issuer data within the interchange database, wherein the issuer data includes whether the issuer bank has entered into a special relationship with the interchange. The server is also configured to interrogate a financial transaction card at an input device, wherein the input device includes at least one of a point of sale (POS) device and an automated teller machine (ATM) device. The server is further configured to receive at the interchange transaction data from the input device, wherein the transaction data includes an identifier indicating whether the transaction is a point of sale (POS) transaction or an automated teller machine (ATM) transaction, and an identity of the issuer bank issuing the interrogated financial transaction card. The server is configured to access the interchange database, match the transaction data including the identity of the issuer bank with the issuer data stored within the interchange database; and automatically assign an interchange rate to the transaction based on the received transaction data and the issuer data stored within the interchange database.

In another aspect, a computer coupled to an interchange database for assigning interchange rates to a financial transaction performed by a cardholder using a card over a card interchange is provided. The computer is in communication with an input device including at least one of a point of sale (POS) device and an automated teller machine (ATM) device. The card is issued by an issuer bank. The computer is programmed to store issuer data within the interchange database. The issuer data includes whether the issuer bank has entered into a special relationship with the interchange. The computer is also programmed to receive transaction data from the input device, wherein the transaction data includes an identifier indicating whether the transaction is a POS transaction or an ATM transaction, and an identity of the issuer bank issuing the interrogated financial transaction card. The computer is further programmed to access the interchange database and to match the transaction data including the identity of the issuer bank with the issuer data stored within the interchange database. The computer is also programmed to assign an interchange rate to the transaction based on the received transaction data and the issuer data stored within the interchange database.

In another aspect, a computer program embodied on a computer readable medium for assigning an interchange rate to a financial transaction is provided. There is at least one input device in communication with an interchange database. The input device includes at least one of a point of sale (POS) device and an automated teller machine (ATM) device. The financial transaction is initiated by a cardholder using a card over a card interchange. The card is issued by a issuer bank. The program includes at least one code segment that stores issuer data within the interchange database. The issuer data includes whether the issuer bank has entered into a special relationship with the interchange. The program also includes at least one code segment that receives transaction data from the input device, wherein the transaction data includes an identifier indicating whether the transaction is a POS transaction or an ATM transaction, and an identity of the issuer bank issuing the interrogated financial transaction card. The program further includes at least one code segment that accesses the interchange database and matches the transaction data including the identity of the issuer bank with the issuer data stored within the interchange database. The program also includes at least one code segment that automatically assigns an interchange rate to the transaction based on the received transaction data and the issuer data stored within the interchange database.

DETAILED DESCRIPTION OF THE INVENTION

Figure 1:
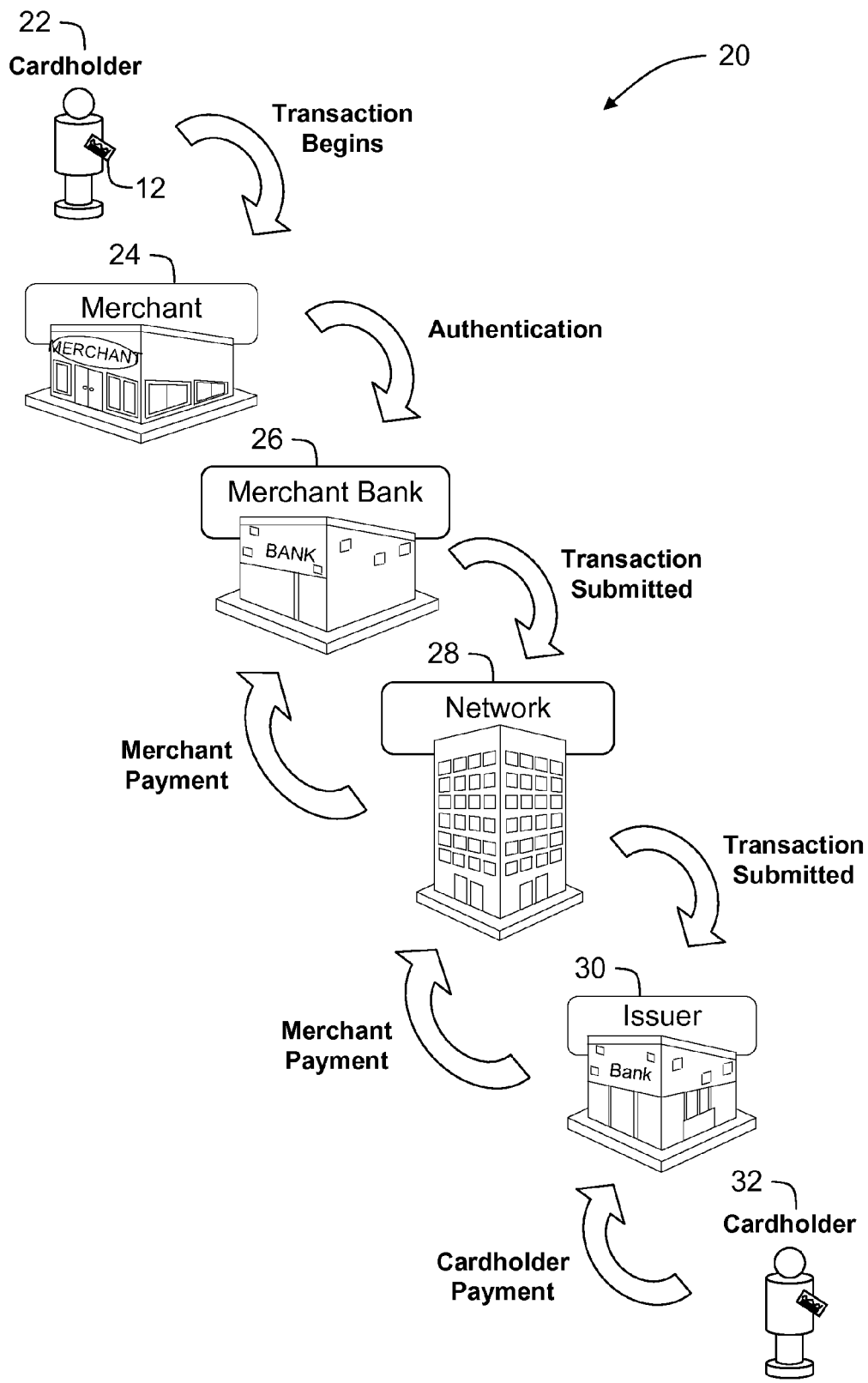
FIG. 1 is a schematic diagram illustrating an exemplary multi-party transaction card industry system for enabling ordinary transaction card transactions in which the merchants and issuer do not need to have a special relationship.

Described in detail herein are exemplary embodiments of systems and processes for implementing special issuer-association relationships in the financial transaction card industry and assigning interchange rates to financial transactions that use such a transaction card based on the special issuer-association relationships. The systems and processes include a cardholder that receives a transaction card from an issuer and utilizes the transaction card to make a purchase from a merchant at a point-of-sale (POS), or conduct a transaction using an automated teller machine (ATM). This embodiment relates to those transactions requiring a personal identification number or "PIN". The card issuer has registered with a bankcard network, also known as an interchange, such that a purchase made by the cardholder using the transaction card can be processed over the bankcard network.

Regarding terminology, financial transaction cards or payment cards can refer to credit cards, debit cards, and prepaid cards. These cards can all be used as a method of payment for performing a transaction. As described herein, the term "financial transaction card" or "transaction card" includes cards such as credit cards, debit cards, and prepaid cards, but also includes any other devices that may hold payment account information, such as mobile phones, personal digital assistants (PDAs), and key fobs.

Issuing banks typically pay a fee, called an interchange rate, to an acquiring bank when a cardholder uses the acquiring or acquiring bank's ATM. On the other hand, when the cardholder uses the card at a POS, the merchant or acquiring bank will pay an interchange rate to the card issuer. These rates are hidden to the cardholder, but they may add to the operating costs or revenues for the issuing bank. The issuing bank may belong to several associations or networks, all of whom charge this interchange rate. The issuing bank will be charged or credited this interchange rate through a particular network each time a cardholder uses an ATM or makes a POS purchase. Reducing the rate charged to the issuing bank for ATM usage, and increasing the rate paid to the issuing bank for POS purchases, can be used to reward the issuing bank for its special relationship with the bankcard network. For example, an issuing bank can become an "exclusive" client of a particular bankcard network or interchange, wherein all purchases or ATM usages involving such a card will utilize the particular interchange. An "exclusive" issuing bank will receive the best interchange rates from the bankcard network for its transactions. Similarly, an issuing bank can become a "priority" client of a particular bankcard network or interchange, wherein most purchases or ATM usages involving such a card will utilize the particular interchange. A "priority" issuing bank will receive better interchange rates from the bankcard network for its transactions, as compared to non-priority clients, but typically not as good of rates as an exclusive issuing bank.

The systems and processes described herein facilitate rewarding the card issuer for being an exclusive or priority client of the transaction card association or network. For example, an exclusive card issuer will pay a lower interchange rate for ATM transactions than non-exclusive issuers in the bankcard network. Also, the exclusive issuer will receive a higher interchange rate for POS transactions than non-exclusive issuers. The systems and processes also facilitate rewarding a client for being a priority client, as compared to a non-priority client of the transaction card network. For example, a priority card issuer will pay a lower interchange rate for ATM transactions than non-priority issuers in the bankcard network, but more than an exclusive issuer. Also, the priority issuer will receive a higher interchange rate for POS transactions than non-priority issuers. Thus, in the example embodiment, there are three basic tiers or types of issuer banks of the network: (1) exclusive, (2) priority and (3) non-priority. The first two reward the issuer bank for its special relationship with the network. Of course, these three types of issuer banks are described herein for purposes of explanation, and should in no way be limiting. Other types of issuer banks could be included in the system described herein without departing from the spirit of the invention.

More specifically, the systems and processes described herein facilitate, for example, electronic submission of information using a input device, automated extraction of information, and web-based reporting for internal and external system users. A technical effect of the systems and processes described herein include at least one of (a) storing issuer data in an interchange database including each issuer bank having issued a financial transaction card to a cardholder for use over the interchange, and whether an issuer bank has entered into a special relationship with the interchange; (b) interrogating a financial transaction card at an input device, wherein the input device includes at least one of a POS device and an ATM device; (c) receiving at the interchange transaction data from the input device, wherein the transaction data includes an identifier indicating whether the transaction is a POS transaction or an ATM transaction, and an identity of the issuer bank issuing the interrogated financial transaction card; (d) accessing the interchange database; (e) matching the transaction data including the identity of the issuer bank with the issuer data stored within the interchange database; and (f) automatically assigning an interchange rate to the transaction based on the received transaction data and the issuer data stored within the interchange database. In the example embodiment, the system automatically determines whether a special relationship exists between the issuer bank and the interchange, and assigns an interchange rate based on whether such a special relationship exists, and if so, what the special relationship is. In addition, the system described herein is further configured to track and record interchange credits and debits for a plurality of financial transactions between a plurality of acquiring banks and a plurality of issuer banks for a predetermined period of time, and then transmit such credit or debit data to a corresponding acquiring bank or issuer bank for settlement purposes.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other components, assembly packages and processes.

FIG. 1 is a schematic diagram 20 illustrating an exemplary multi-party transaction card industry system for enabling ordinary transaction card transactions in which the merchants and issuer do not need to have a one-to-one special relationship. Embodiments of the present invention relate to a transaction card system, such as a debit card payment system using the MasterCard® payment system. (The system may also be referred to as an interchange or network). The MasterCard® payment system includes a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card 12, such as a debit card, to a consumer, who uses the transaction card to tender payment for a purchase from a merchant at a POS, or to withdraw money or perform another type of financial transaction at an ATM. To accept payment with the transaction card, the merchant must normally establish an account with a financial institution that is part of the financial payment system. This financial institution is usually called the "merchant bank" or the "acquirer bank" or "acquiring bank." When a consumer 22 tenders payment for a purchase with the transaction card 12 and enters in the correct personal identification number (PIN), the merchant 24 requests authorization from the acquiring bank 26 for the amount of the purchase. The request may be performed over the telephone, but is usually performed through the use of a point-of-sale terminal, which reads the consumer's account information from the magnetic stripe on the transaction card and communicates electronically with the transaction processing computers of the acquiring bank. Alternatively, a acquiring bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the acquiring bank will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For POS or ATM transactions, when a request for a PIN authorization is approved by the issuer, the consumer's account 32 is decreased (e.g., for purchases or for cash received at an ATM). Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the acquiring bank, and the issuer, as further described below. Settlement refers to the transfer of financial data or funds between the merchant's account, the acquiring bank, and the issuer related to the transaction. Usually, transactions are captured and accumulated into a "batch," which are settled as a group.

Figure 2:
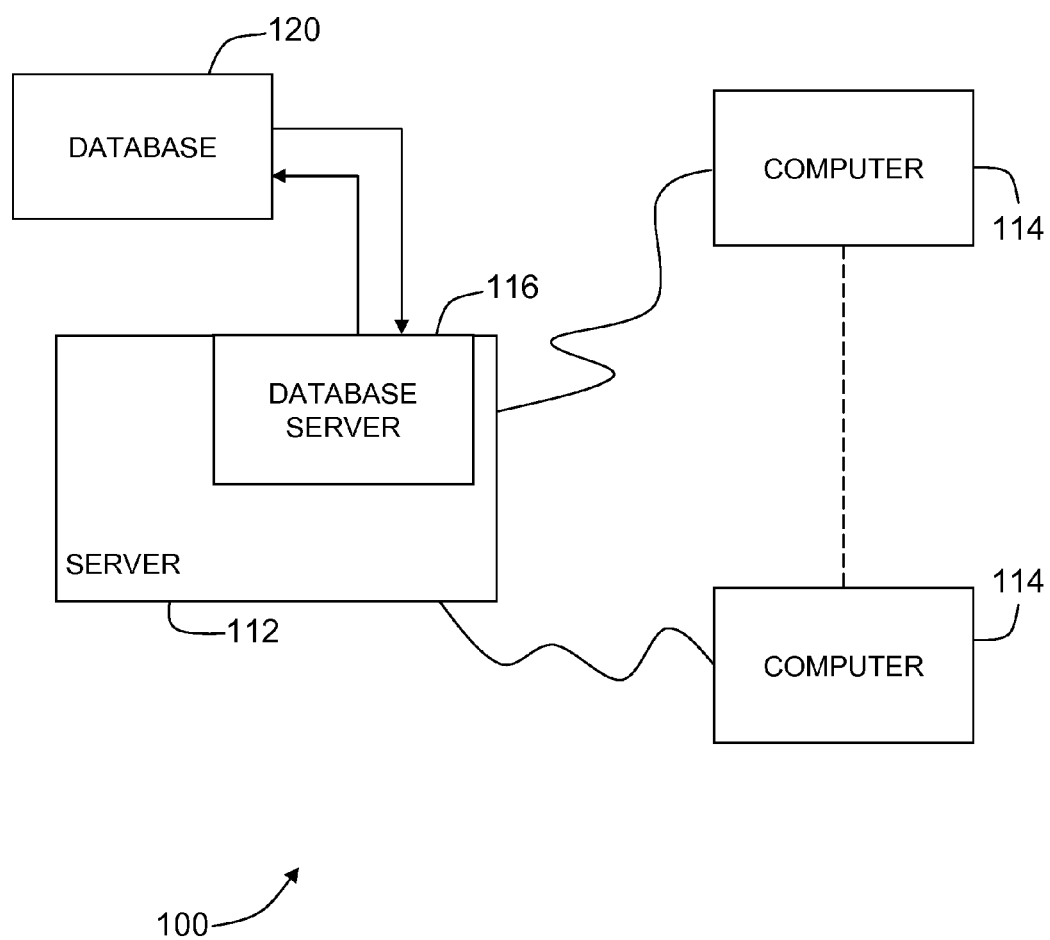
FIG. 2 is a simplified block diagram of an exemplary embodiment of a server architecture of a system in accordance with one embodiment of the present invention.

FIG. 2 is a simplified block diagram of an exemplary system 100 in accordance with one embodiment of the present invention. In one embodiment, system 100 is a transaction card system used for implementing special or customized issuer-interchange relationships. In another embodiment, system 100 is a transaction card system, used for implementing special issuer-interchange relationships by assigning interchange rates to financial transactions that use a transaction card based on the special issuer-interchange relationship.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

As discussed below, database 120 stores transaction data generated as part of sales activities conducted over the bankcard network including data relating to merchants, account holders or clients, and purchases. Database 120 may also include data relating to whether the issuer has a special relationship (exclusive, priority or other, as described below) with the interchange.

Figure 3:
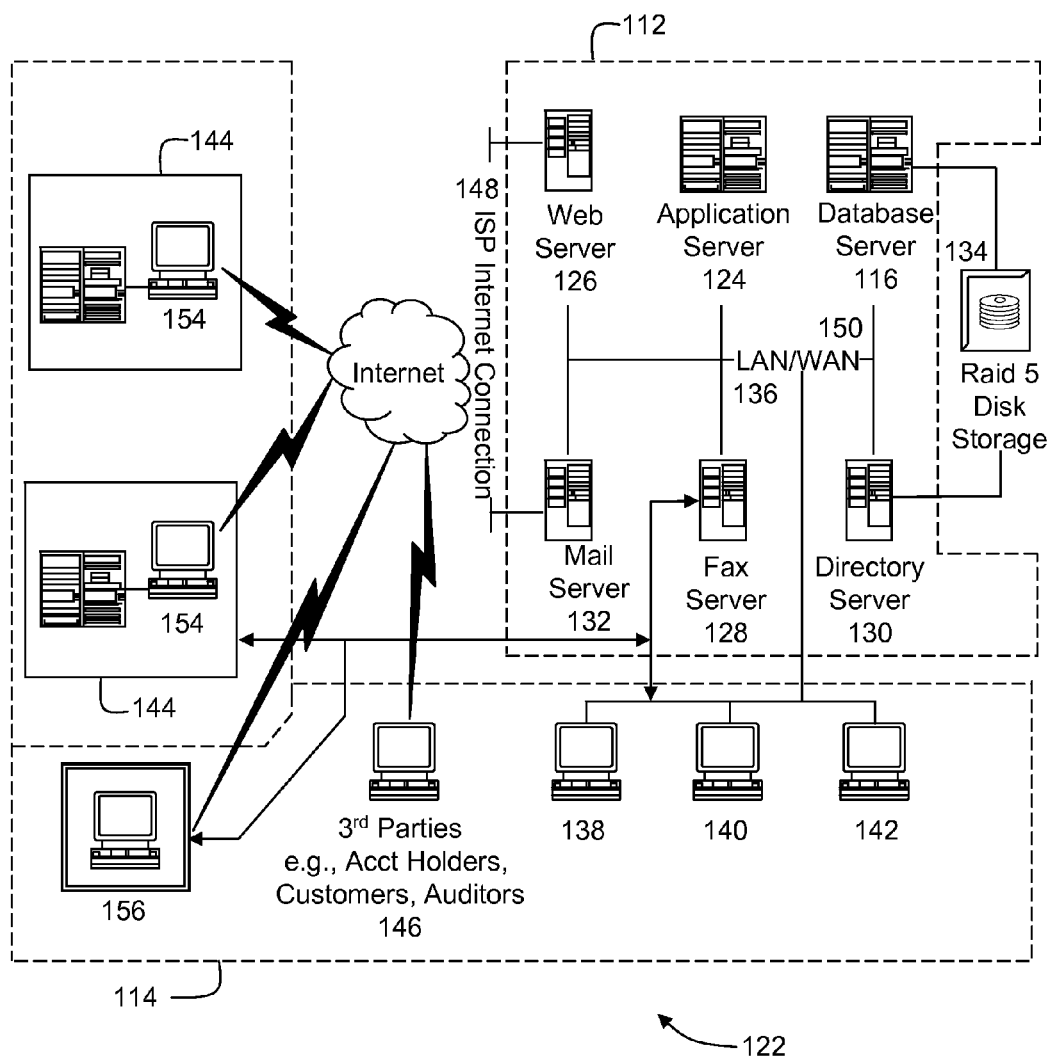
FIG. 3 is an expanded block diagram of an exemplary embodiment of a server architecture of a system in accordance with one embodiment of the present invention.

FIG. 3 is an expanded block diagram of an exemplary embodiment of a server architecture of a system 122 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, clients, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

As noted above, after a transaction is captured, the transaction is settled between the merchant, the acquiring bank, and the issuer. Settlement refers to the transfer of financial data or funds between the merchant's account, the acquiring bank, and the issuer related to the transaction. Usually, transactions are captured and accumulated into a "batch," which are settled as a group.

Figure 4:
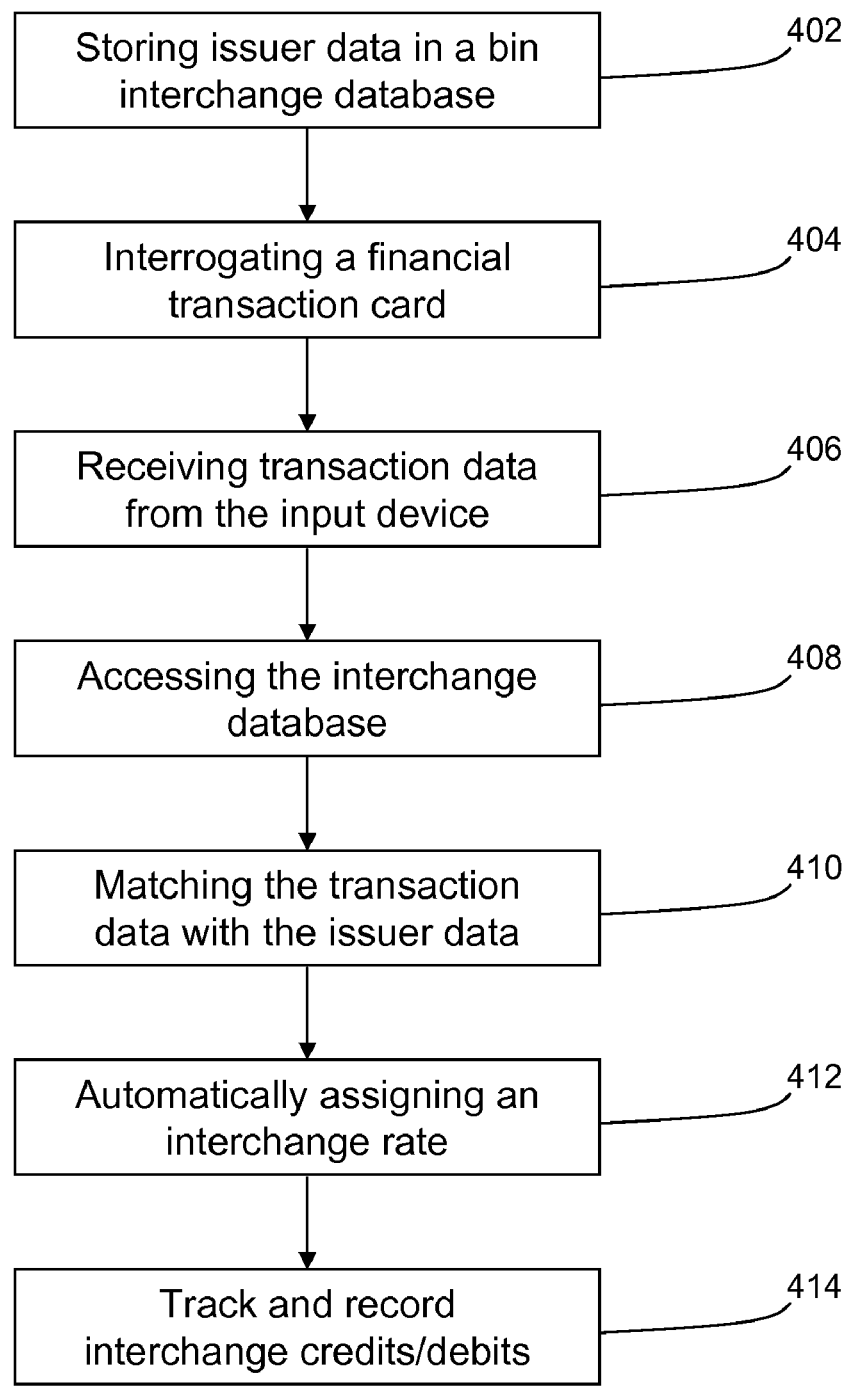
FIG. 4 is a flowchart illustrating an exemplary process in accordance with one embodiment of the present invention.
Figure 5:
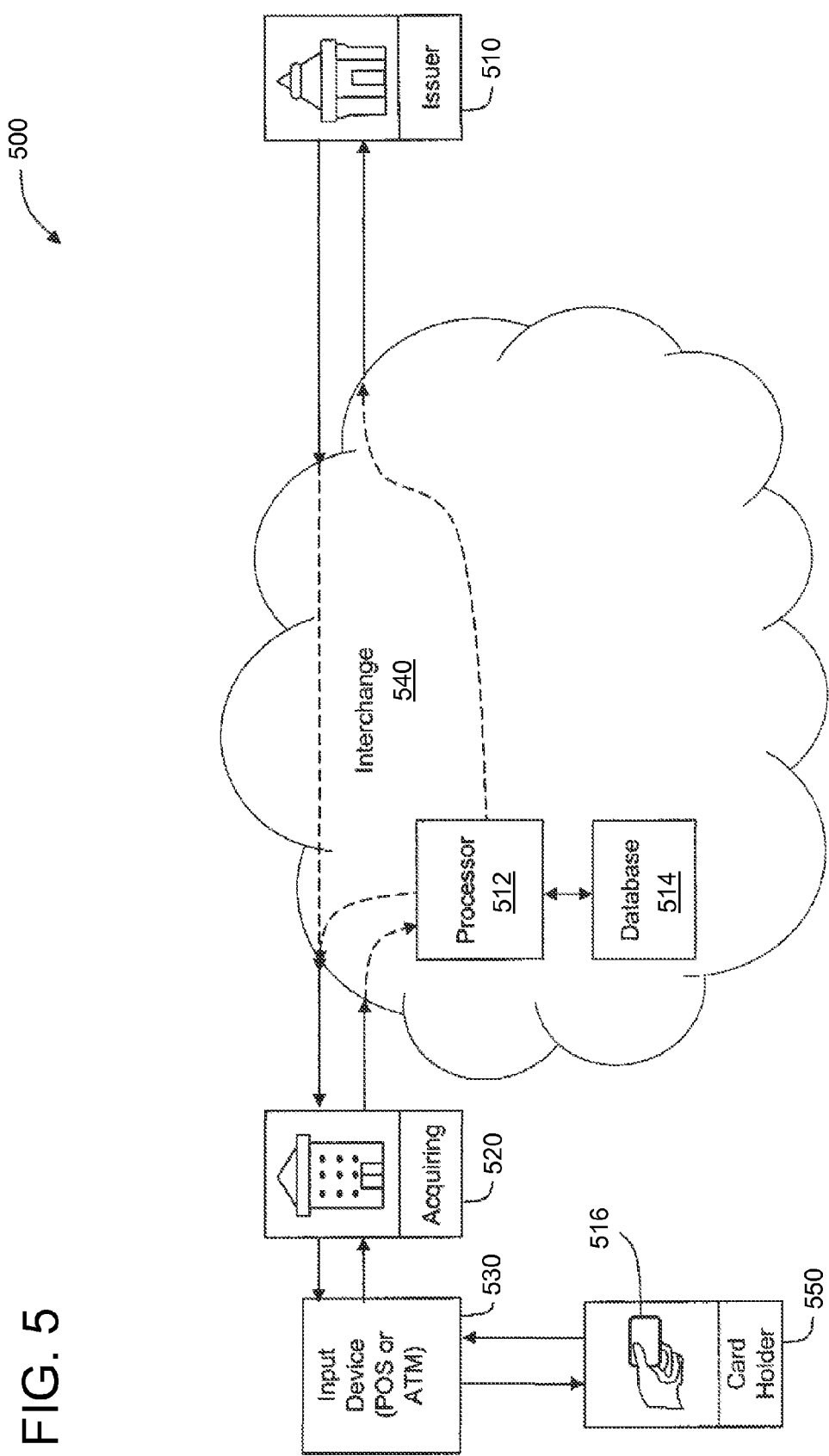
FIG. 5 is a schematic diagram illustrating the process shown in FIG. 4.

FIG. 4 is a flowchart showing exemplary processes utilized by system 100 (shown in FIG. 2) for assigning interchange rates for a financial transaction conducted over an interchange using a financial transaction card in accordance with one embodiment of the present invention. FIG. 5 is a schematic diagram 500 further showing the exemplary processes of FIG. 4. More particularly, FIG. 5 is a schematic diagram 500 illustrating an exemplary process for implementing special or customized issuer-interchange relationships in a payment-by-card system 100 (shown in FIG. 2). System 100 exploits legacy payment-by-card industry infrastructure for implementing a special or customized issuer-interchange relationship. The legacy payment-by-card industry infrastructure includes traditional payment networks (e.g., general purpose bankcard interchange 540 including processor 512 and database 514), which links entities such as the card issuer or bank (e.g., issuer 510), card acceptors (e.g., input device 530 of a merchant or bank), and third-party transaction processors (e.g., acquiring bank 520). System 100 incorporates one or more specific processors and databases (e.g., processor 512 and database 514) as part of its server system 112 for processing and storing special relationship transactions and information in interchange 540. The method may also include cardholder 550 using financial transaction card 516 to execute the transaction. In alternative embodiments, the structure and functions of these processors, databases, modules or units can be merged or partitioned in other ways. Furthermore, separate modules may communicate information directly, or indirectly through other modules. The general steps in this method will be described, followed by discrete examples illustrating the steps.

The technical effect of the systems and processes described herein is achieved by (a) storing issuer data in an interchange database including each issuer bank having issued a financial transaction card to a cardholder for use over the interchange, and whether an issuer bank has entered into a special relationship with the interchange; (b) optionally, interrogating a financial transaction card at an input device, wherein the input device includes at least one of a POS device and an ATM device; (c) receiving at the interchange transaction data from the input device, wherein the transaction data includes an identifier indicating whether the transaction is a POS transaction or an ATM transaction, and an identity of the issuer bank issuing the interrogated financial transaction card; (d) accessing the interchange database; (e) matching the transaction data including the identity of the issuer bank with the issuer data stored within the interchange database; and (f) automatically assigning an interchange rate to the transaction based on the received transaction data and the issuer data stored within the interchange database.

The flowchart of FIG. 4 shows an exemplary process or method for assigning interchange rates. Step 402 in the method is storing issuer data in the interchange database 514 through processor 512, part of the server system of the interchange 540. The issuer data includes whether each issuer bank 510 in the database has entered into a special relationship with the interchange 540. The data may also include whether particular "BINs" (Bank Identification Numbers) of cards, (or subsets of the cards issued by the issuer bank 510), have a special relationship with the bank. For example, certain BINs of cards from the issuer bank may have one relationship, and other BINs from the issuer bank may have a different relationship with the interchange 540. The special relationship is stored as an interchange designation for each issuer bank, or particular BINs from the issuer bank. There is also stored a corresponding interchange rate for each issuer bank 510 or BIN thereof. Entry of the identifying data may be done at one of the workstations 154 referenced above, or in another suitable manner. The possible interchange designations in one embodiment include at least one of the following:

E=Exclusive Transaction Routing
A=ATM Priority Routing
P=POS Priority Routing
B=Both ATM and POS Priority Routing
O=Other In the example embodiment, if an issuer bank 510, or a BIN of the issuer bank's cards, uses the network exclusively, the issuer bank or that particular BIN is assigned the interchange designation "E". If an issuer bank 510, or a BIN of the issuer bank's cards, gives priority to the network for only ATM transactions, then it or the particular BIN receives an "A" designation. If an issuer bank, or a BIN of the issuer bank's cards, gives priority to the interchange for only POS transactions, then it or a particular BIN receives a "P" designation. If an issuer bank, or a BIN of the issuer bank's cards, gives priority to both ATM and POS transactions, then it or a particular BIN receives a "B" designation. (Note that a card 516 with such priority may have other networks' logos on the card itself, in addition to that of the priority network.) Finally, if an issuer bank, or a BIN of the issuer bank's cards, is not exclusive and gives no priority for either type of transaction, it or the BIN receives an "O" designation.

The special relationships described herein also include or are governed by certain business rules that are agreed to by the parties involved in the transaction, namely the acquiring bank 520, the issuer 510 and the interchange 540. The rules control how transactions are routed by the acquiring bank 520. For example, if there are at least two networks or interchanges printed on the card 516, and the acquiring bank 520 has access to both interchanges, then the "priority" interchange is the one designated by the issuer 510 as its first choice for transaction routing or processing by the acquiring bank 520. The acquiring bank 520 should route the transaction to the priority interchange. In some cases, the acquiring bank 520 may choose not to route the transaction to the priority interchange despite the priority relationship, e.g., if the acquiring bank gets a more favorable rate from another interchange. The issuer 510 can overcome this problem by changing the issuer-interchange relationship to exclusive. Note also, if the acquiring bank 520 does not have access to the priority interchange, then it can route the transaction through another interchange. There are additional rules on how acquiring banks 520 must route priority transactions, as understood by one of ordinary skill in the art. Generally, the priority interchange is the one that must be the first choice for routing the transaction.

The interchange rate for an "E" designated issuer bank 510 will be the lowest rate for ATM transactions, and will be the highest rate for POS transactions. As an example, the rate for an "E" designated issuer bank may be $0.35 for ATM transactions, and $1.00 for POS transactions. The interchange rate for designations A, P and B (priority routing) will be at an intermediate rate, i.e., between the highest and lowest rates, for both POS and ATM transactions. As an example, the interchange rate for these transactions may be set at $0.50. In contrast, the interchange rate for an "O" designated issuer bank will be the highest rate for ATM transactions, and will be the lowest rate for POS transactions. As an example, the interchange rate for ATM transactions may be $1.00, and for POS transactions the rate may be $0.30.

In some embodiments, there may also be additional classifications and interchange rates for certain transactions at the ATM or POS. As one example, there may be additional classifications for ATM transactions, such as "Withdrawal Debit (approved)", "Withdrawal Credit (approved)", "Balance Inquiry" and "Denials". Suitable interchange rates may be associated with these additional classifications.

As described above, each issuer bank 510 has previously issued a transaction card 516 to a cardholder 550 for use over the interchange 540. In step 404 of one embodiment of the method, the card is interrogated at an input device 530. The input device may be of any type in the industry, including but not limited to POS devices and ATM devices. The interrogation generates transaction data, and in step 406, the processor 512 of the interchange 540 receives the transaction data from the input device. The transaction data includes an identifier for the type of transaction (POS or ATM) and the identities of the acquiring bank 520 and the issuer bank 510 that issued the card. The data identifying the issuer bank may be referred to as the "BIN table", and is typically the first several digits on the transaction card. Other data may also be included in the transaction data within the scope of the invention.

In steps 408 and 410, the processor 512 accesses the interchange database 514 and matches the transaction data (including the identity of the issuer bank) with the stored identifying data for the issuer bank 510 in the interchange database. In step 412, the processor 512 automatically assigns an interchange rate to the transaction based on the received transaction data and the issuer data stored within the interchange database 514. The proper rate will depend on the interchange designations noted above. The system thereby automatically determines whether a special relationship exists between the issuer bank and the interchange, and assigns an interchange rate based on whether such a special relationship exists, and if so, what the special relationship is.

In step 414, the proper interchange rate is stored in the database 514 as either a credit or a debit against the issuer bank and against the corresponding acquiring bank. As steps 404-414 are repeated, interchange credits and debits for a plurality of financial transactions between a plurality of acquiring banks 520 and a plurality of issuer banks 510 are stored for a predetermined period of time. The credits and debits between the issuer bank 510 and the acquiring bank 520 are summed to arrive at a total credit or debit for the total transactions between the two banks. The credits and debits are thereafter transmitted to the corresponding acquiring bank 520 or issuer bank 510 for settlement purposes. Typically, this settlement is done on a daily basis, and the respective credit or debit is transmitted to the issuer bank and the acquiring bank. In system 500, a merchant accounting system (not shown) can create payment files to move debit/credit funds directly between the merchants' and issuer's accounts for the differential amounts or the fees involved in the transaction.

Note that steps 404-414 are repeated for each transaction received by the interchange 540 using the data entered in step 1. In contrast, step 402 will not typically be performed before each transaction, but rather, will be performed when the issuer bank is added to the system and occasionally thereafter when the status of the issuer bank is updated due to changes in its routing procedures.

In one example, identifying data for BINs of issuer banks 510 are stored in the interchange database of the interchange 540. Each BIN from an issuer bank is assigned an interchange designation of either E, A, P, B, or O. Thereafter, transaction data for a particular ATM transaction is transmitted to the processor of the interchange 540 and captured therein. The transaction data includes the fact that the transaction was performed at an ATM, and that it was, for example, a withdrawal of $100. The transaction data also includes information (e.g., the identity) of the acquiring bank and the BIN of the issuer bank (the BIN table). The processor 512 compares the data to the stored data in the interchange database 514. In particular, the processor 512 compares the BIN to the BIN table stored in the interchange database 514, and determines the interchange rate. In this example, the BIN has an "E" interchange designation, meaning the bank is an exclusive client. Accordingly, the interchange rate is the lowest available, and the issuer bank will be charged at the lowest interchange rate for an ATM transaction. As noted above, if the interchange designation was an A or B, the interchange rate would be higher, and if the designation was O, it would be still higher.

In a second example, subsequent to the identifying data for BINS of issuer banks 510 being stored in the interchange database 514, transaction data for a particular POS transaction is transmitted to the interchange 540 and received therein. The transaction data includes the fact that the transaction was performed at a POS, and that the amount is $200. The transaction data also includes the acquiring bank and the issuer bank BIN information. The processor compares the issuer bank BIN to that stored in the interchange database, and determines the interchange rate. In this example, the issuer bank has an "E" interchange designation, meaning the bank is an exclusive client. Accordingly, the issuer bank will be charged at the lowest interchange rate for an ATM transaction.

Transactions in the first and second examples are tracked by the processor 512 and recorded in the interchange database 514, along with many other transactions. The credits and debits between each issuer bank 510 and each acquiring bank 520 are summed to arrive at a total credit or debit for the total transactions between banks. The credits and debits are thereafter transmitted to the corresponding acquiring bank or issuer bank for settlement purposes.

In other embodiments, the network may choose to have a simplified system wherein the "priority routing" designations are omitted. In other words, the only interchange designations stored for issuer banks would be "E" and "O". All other steps in the process would be as described above.

As can be seen from the above description, embodiments of the invention can be used to encourage card issuers to route transactions through a given network. By reducing the fees for ATM transactions charged to the issuer bank, and by increasing the fees awarded to the issuer bank for POS transactions, the card issuer will tend to route its transactions exclusively through the network or interchange, or at the least give priority to transactions routed through the network. Moreover, if an acquiring bank tends to route an issuer's priority transactions through another network, e.g., because another network has more favorable rates for the acquiring bank, then the issuer has an incentive under the new methods and systems to make its relationship with the network exclusive to take advantage of the favorable rates given to the issuer by the network. Depending on the application, the interchange rates may be updated as often as desired to more quickly reward issuer banks that exclusively use the network.

While the present application describes what are believed to be the preferred embodiments of the present invention, those skilled in the art will recognize that further changes and modifications may be made thereto without departing from the spirit of the invention, and it is intended to claim all such changes and modifications that are within the spirit of the invention.

It also will be understood that the systems and methods of the present invention can be implemented using any suitable combination of hardware and software. The software (i.e., instructions) for implementing and operating the aforementioned systems and methods can be provided on computer-readable media, which can include without limitation, firmware, memory, storage devices, micro controllers, microprocessors, integrated circuits, ASICS, on-line downloadable media, and other available media.

While the invention has been described in terms of various specific embodiments, those skilled in the art will recognize that the invention can be practiced with modification within the spirit and scope of the claims.

What is claimed is:

1. A method for assigning an interchange rate to a financial transaction using at least one input device in communication with an interchange database over an interchange, the financial transaction initiated by a cardholder using a financial transaction card over the interchange, the card issued by an issuer bank, said method comprising the steps of:
   storing issuer data within the interchange database, the issuer data including whether the issuer bank has a predefined relationship with the interchange;
   receiving at the interchange, transaction data from the input device, wherein the transaction data includes bank identification data;
   accessing the interchange database;
   comparing, at a computer associated with the interchange, the bank identification data to the issuer data stored within the interchange database;
   determining, at the computer associated with the interchange, a type of predefined relationship between the issuer bank and the interchange;
   automatically assigning, at the computer associated with the interchange, an interchange rate to the transaction based on the determined type of predefined relationship, wherein the interchange rate is stored in the interchange database as either a credit or debit to a corresponding issuer bank and acquiring bank, and each financial transaction occurs through an acquiring bank; and
   summing debits and credits for a plurality of transactions involving the acquiring bank and the issuer bank, and transmitting a credit or debit to the acquiring bank and the issuer bank on a periodic basis.

2. A method according to claim 1 wherein the type of predefined relationship is one of an exclusive automated teller machine (ATM) transaction routing, exclusive point-of-sale (POS) transaction routing, ATM priority transaction routing, POS priority transaction routing, and both ATM and POS priority transaction routing.

3. A method according to claim 2 wherein automatically assigning an interchange rate comprises assigning a lowest interchange rate for the exclusive ATM transaction routing relationship and a highest interchange rate for the POS priority transaction routing predefined relationship.

4. A method according to claim 1, wherein:
   the type of predefined relationship is one of an exclusive automated teller machine (ATM) transaction routing, exclusive point-of-sale (POS) transaction routing, ATM priority transaction routing, POS priority transaction routing, and both ATM and POS priority transaction routing;
   automatically assigning an interchange rate comprises assigning a lowest interchange rate for the exclusive ATM transaction routing relationship and a highest interchange rate for the POS priority transaction routing predefined relationship; and storing issuer data comprises storing a bank identification number (BIN) table, and the bank identification data comprises a BIN.

5. A method according to claim 1, wherein:

the type of predefined relationship is one of an exclusive automated teller machine (ATM) transaction routing, exclusive point-of-sale (POS) transaction routing, ATM priority transaction routing, POS priority transaction routing, and both ATM and POS priority transaction routing;

automatically assigning an interchange rate comprises assigning a lowest interchange rate for the exclusive ATM transaction routing relationship and a highest interchange rate for the POS priority transaction routing predefined relationship;

storing issuer data comprises storing a bank identification number (BIN) table, and the bank identification data comprises a BIN; and the BIN number comprises a portion of an account number of the transaction card.

6. A method according to claim 1, wherein:

storing issuer data comprises storing a bank identification number (BIN) table, and the bank identification data comprises a BIN;

the BIN table includes an interchange rate associated with a combination of a BIN number and a transaction type, and the predefined relationship is defined by the combination of the BIN number and transaction type, and each predefined relationship is assigned an interchange rate corresponding to the type of predefined relationship.

7. A method according to claim 1, wherein:

the type of predefined relationship is one of an exclusive automated teller machine (ATM) transaction routing, exclusive point-of-sale (POS) transaction routing, ATM priority transaction routing, POS priority transaction routing, and both ATM and POS priority transaction routing; and automatically assigning an interchange rate comprises assigning a higher interchange rate for the priority ATM routing than the exclusive ATM transaction routing and a lower interchange rate for the priority POS transaction routing than the exclusive POS transaction routing.

8. A method according to claim 1, wherein:

the type of predefined relationship is one of an exclusive automated teller machine (ATM) transaction routing, exclusive point-of-sale (POS) transaction routing, ATM priority transaction routing, POS priority transaction routing, and both ATM and POS priority transaction routing; and storing issuer data further comprises storing data within the database including whether the issuer bank has the same type of predefined relationship for all transactions or only for certain types of transactions.

9. A network-based system for assigning an interchange rate to a financial transaction, the financial transaction initiated by a cardholder using a transaction card over an interchange, wherein the transaction card is issued by an issuer bank, said system comprising:

an interchange database for storing information; and a server system configured to be coupled to an input device and said interchange database, said server system further configured to:

store issuer data within the interchange database, the issuer data including whether the issuer bank has entered into a predefined relationship with the interchange;

receive transaction data from the input device, wherein the transaction data includes bank identification data indicating an identity of the issuer bank issuing the transaction card;

access the interchange database;

compare the received bank identification data of the issuer bank with the issuer data stored within the interchange database;

determine a type of predefined relationship between the issuer bank and the interchange;

automatically assign an interchange rate to the transaction based on the determined type of predefined relationship, wherein the interchange rate is stored in the interchange database as either a credit or debit to a corresponding issuer bank and acquiring bank and each financial transaction occurs through an acquiring bank; and sum debits and credits for a plurality of transactions involving the acquiring bank and the issuer bank, and transmitting a credit or debit to the acquiring bank and the issuer bank on a periodic basis.

10. A system according to claim 9 wherein the type of predefined relationship includes at least one of an exclusive automated teller machine (ATM) transaction routing, exclusive point-of-sale (POS) transaction routing, ATM priority transaction routing, POS priority transaction routing, and both ATM and POS priority transaction routing.

11. A system according to claim 10 wherein the server automatically assigns a lowest interchange rate for the exclusive issuer ATM transaction routing and a highest rate for the exclusive issuer POS transaction routing.

12. A system according to claim 10 wherein the server assigns a higher interchange rate for a priority ATM transaction routing than an exclusive issuer ATM transaction routing, and a lower interchange rate for a priority issuer POS transaction routing than an exclusive issuer POS transaction routing.

13. A system according to claim 9 wherein the stored issuer data comprises a bank identification number (BIN) table, and the bank identification data comprises a BIN, wherein the BIN table includes an interchange rate associated with a combination of a BIN number and a transaction type, and the predefined relationship is defined by the combination of the BIN number and transaction type.

14. A system according to claim 13 wherein the bank identification the BIN number comprises a portion of an account number of the transaction card.

15. A system according to claim 9, wherein:

the stored issuer data comprises a bank identification number (BIN) table, the BIN table includes an interchange rate associated with a combination of a BIN number and a transaction type, and the predefined relationship is defined by the combination of the BIN number and transaction type, and the bank identification data comprises a BIN.

16. A system according to claim 9, wherein:

the type of predefined relationship is one of an exclusive automated teller machine (ATM) transaction routing, exclusive point-of-sale (POS) transaction routing, ATM priority transaction routing, POS priority transaction routing, and both ATM and POS priority transaction routing; and the server is associated with the interchange, and wherein the server is further configured to store issuer data within the database including whether the card issuer has a same type of predefined relationship for all transactions or only for certain types of transactions.

17. A computer coupled to an interchange database for assigning interchange rates to a financial transaction performed by a cardholder using a transaction card over a card interchange, the computer in communication with a transaction input device, the transaction card having been issued by an issuer bank, said computer programmed to:
   store issuer data within the interchange database, the issuer data including whether the issuer bank has entered into a predefined relationship with the interchange;
   receive transaction data from the input device, wherein the transaction data includes bank identification data indicating an identity of the issuer bank issuing the transaction card;
   access the interchange database;
   compare the bank identification data with the issuer data stored within the interchange database to determine a type of predefined relationship between the issuer bank and the interchange;
   assign an interchange rate to the transaction based on the determined predefined relationship, wherein the interchange rate is stored in the interchange database as either a credit or debit against a corresponding issuer bank and acquiring bank and each financial transaction occurs through an acquiring bank; and
   sum debits and credits for a plurality of transactions involving the acquiring bank and the issuer bank, and transmitting a credit or debit to the acquiring bank and the issuer bank on a periodic basis.

18. A computer according to claim 17 wherein the type of predefined relationship is one of an exclusive automated teller machine (ATM) transaction routing, exclusive point-of-sale (POS) transaction routing, ATM priority transaction routing, POS priority transaction routing, and both ATM and POS priority transaction routing.

* * * * *